Figure 1:
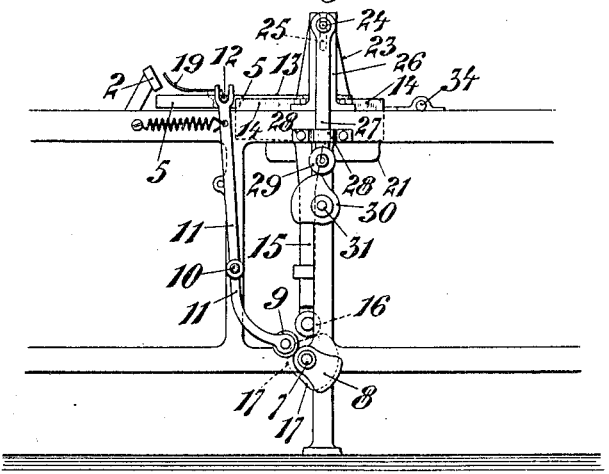

No. 791,363. PATENTED MAY 30, 1905.
H. PECHER.
MACHINE FOR COATING BISCUITS OR OTHER ARTICLES WITH SUGAR,
CHOCOLATE, OR SIMILAR ICING.
APPLICATION FILED OCT. 3, 1904.

3 SHEETS—SHEET 1.

Witnesses:

Inventor
Hermann Pecher
By
James L. Norris
Atty

No. 791,363. PATENTED MAY 30, 1905.
H. PECHER.
MACHINE FOR COATING BISCUITS OR OTHER ARTICLES WITH SUGAR,
CHOCOLATE, OR SIMILAR ICING.
APPLICATION FILED OCT. 3, 1904.

3 SHEETS—SHEET 2.

Witnesses

Inventor
Hermann Pecher
By
James L. Norris
Atty

No. 791,363. PATENTED MAY 30, 1905.
H. PECHER.
MACHINE FOR COATING BISCUITS OR OTHER ARTICLES WITH SUGAR,
CHOCOLATE, OR SIMILAR ICING.
APPLICATION FILED OCT. 3, 1904.

3 SHEETS—SHEET 3.

Witnesses:

Inventor
Hermann Pecher
By
James L. Norris
Atty.

No. 791,363. Patented May 30, 1905.

UNITED STATES PATENT OFFICE.

HERMANN PECHER, OF DETMOLD, GERMANY.

MACHINE FOR COATING BISCUITS OR OTHER ARTICLES WITH SUGAR, CHOCOLATE, OR SIMILAR ICING.

SPECIFICATION forming part of Letters Patent No. 791,363, dated May 30, 1905.

Application filed October 3, 1904. Serial No. 227,041.

*To all whom it may concern:*

Be it known that I, HERMANN PECHER, manufacturer, a subject of the Prince of Lippe, residing at Detmold, in the Principality of Lippe, German Empire, have invented certain new and useful Improvements in or Relating to Machines for Coating Biscuits or other Articles with Sugar, Chocolate, or Similar Icing, of which the following is a specification.

My invention relates to improvements in or relating to machines for coating biscuits and other articles with sugar, chocolate, or other materials.

The object of the invention aims to provide a machine for coating biscuits or other articles with sugar, chocolate, or other material, particularly adapted for coating perforated articles, as well as overcoming the objection of the soiling of the conveyer for the coated articles, as in the machines now in general use. The part of the machine which dips the articles also transfers the articles as well as turns the articles over onto and upon the conveyer.

It is furthermore found impossible to dip the articles several times in succession when employing machines now in general use and obtain a uniform spreading of the coating material upon the articles, and such objection is overcome by the machine hereinafter described.

The known machines which are suitable for treating biscuits or other articles (hereinafter called "articles") of any size, thickness, and shape are generally so complicated and so difficult to handle that they have not been or are but very little used.

The above drawbacks are avoided by my invention, which is distinguished by being capable of dealing with articles of any desired shape and size. The articles are introduced in rows into the compartments of a grate-shaped transport-frame moving forward and backward to the extent of the width of one row on a fixed support and also moving up and down, which frame pushes the articles in rows onto a perforated frame rising and descending at suitable moments and dipping into the icing, from which frame the work after having been dipped one or more times is pushed off onto a "depositor" or "turn-over rack," which again deposits the dipped work with its covered surface upward on the transport-band.

A construction of that part of the machine according to this invention which contains its new parts is illustrated in the accompanying drawings, in which—

Figure 2:
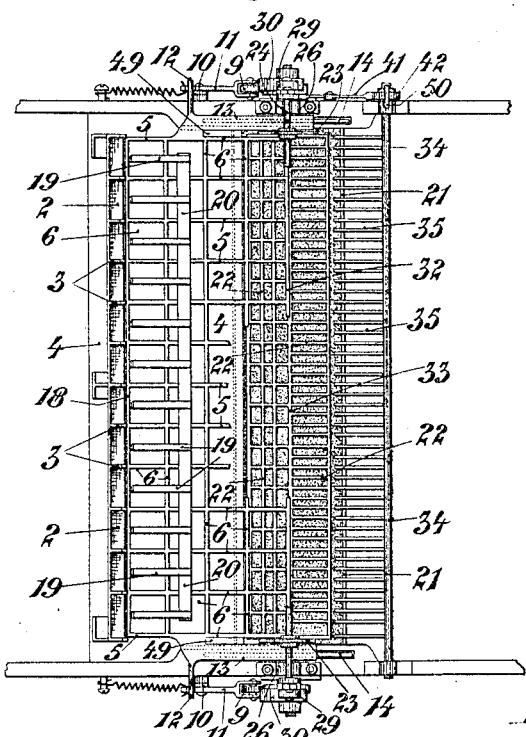
Figure 3:
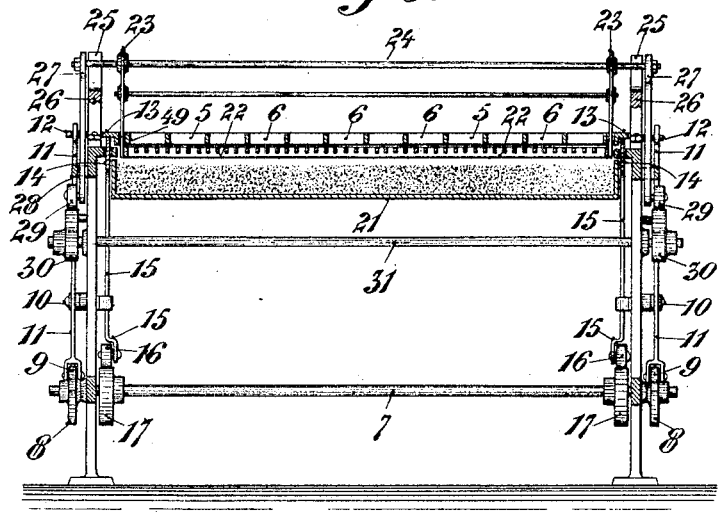
Figure 4:
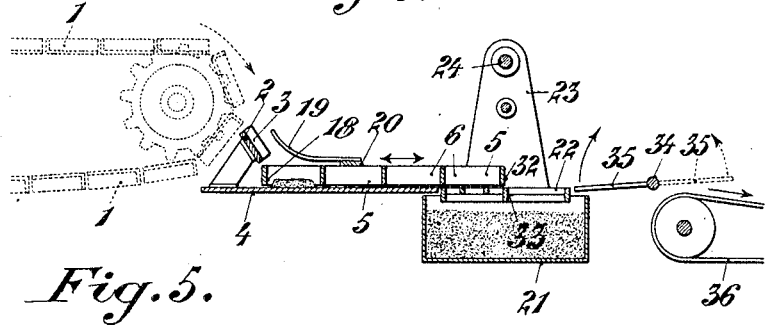
Figure 5:
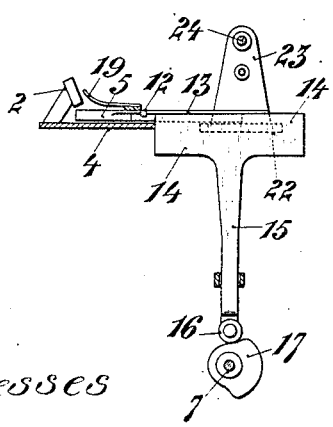
Figure 6:
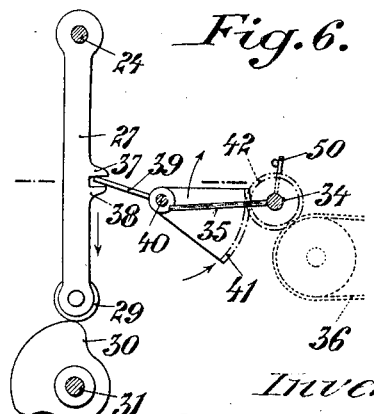
Figure 7:
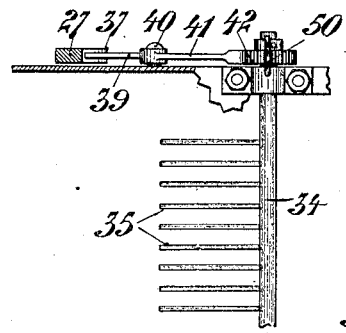
Figure 8:
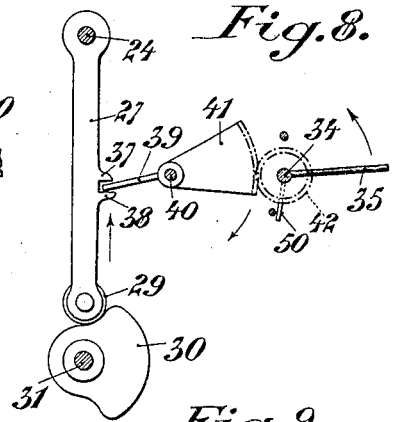
Figure 9:
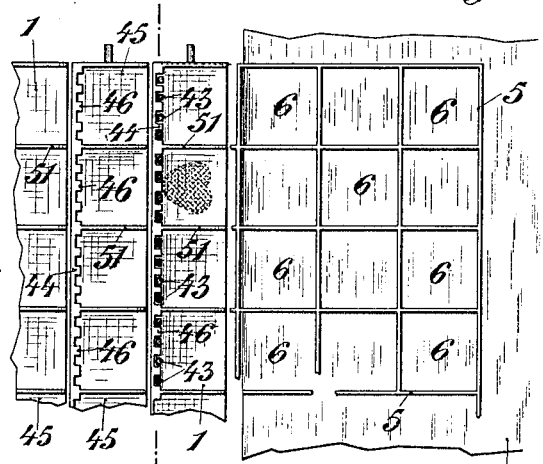
Figure 10:
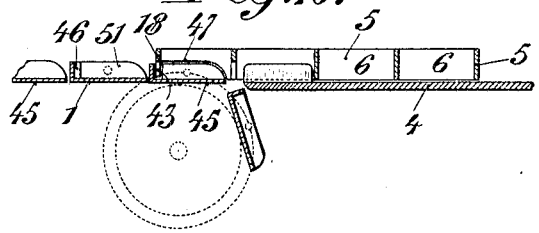
Figure 11:
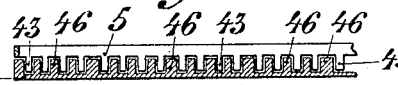

Figure 1 is a side elevation; Fig. 2, a plan with the transport or carrier frame partly broken off; Fig. 3, a vertical cross-section, and Fig. 4 a vertical longitudinal section, all these figures showing the apparatus diagrammatically. Figs. 5 to 8 are detail views, and Figs. 9 to 11 show a modified construction of the transport frame or grating.

The articles are delivered from the well-known transport band or chain provided with compartments arranged in rows onto an oblique chute 2, corresponding to the said compartments. In order to cause the articles to retain the position given to them, the chute in question, which is a piece of sheet metal, is provided with transverse ribs 3, corresponding to the cross-ribs of the carrier-chain links or with the ribs of the compartment row of the same. The chute 2 is mounted on a table 4, and on the said table there moves a carrier-frame 5, divided into rows of compartments 6. The compartments 6 correspond to those of the chute 2 and the carrier-chain 1. The transport-frame 5 executes a forward and a backward movement to the width of about one row of compartments, said movement being produced by a transverse spindle 7 of the machine by means of cams 8, arranged at both sides of the machine. The cams 8 act on slide-rollers 9, mounted on the shorter arms of two spring or weight controlled double levers 11, projecting upward and pivoted at 10 to the machine-frame. The upper ends of the levers are fork-shaped and loosely engage the pins 12, arranged on both sides of the transport-frame 5. Besides its horizontal reciprocating movements the transport-frame 5 also executes a vertical reciprocating movement approximately to the extent of its height, and for that purpose it rests with lateral angle-pieces 13 loosely on rails 14 and is vertically guided in the frame. The rails 14 are provided with downward arms 15, guided on the frame and carrying at the lower ends rollers 16. These rollers are operated by cams 17, mounted on the cross-spindle 7. When the carrier-frame 5 occupies its left and lowest position in Fig. 4 and its left frame-wall 18 is directly under the chute 2, the articles will be discharged into the left row of compartments of the transport-frame 5 and rest on the table 4. When the transport-frame 5 moves toward the right, the articles contained in the left row of compartments of the same are moved forward by its left wall 18 to the extent of the width of one compartment on the table 4. Then the frame 5 rises during its return to its left position in order not to take the articles back again to their former places on the table and in order again to seize and move forward the next articles which after its return and descent have fallen from the next carrier-chain link over the chute 2 on the table 4. All the compartments of the carrier-frame 5 having been so provided with articles in the way described the first row of articles on the table 4 reaches at the next movement of the carrier-frame 5 the dipping-frame 22, arranged directly over the reservoir 21, containing sugar, chocolate, or any icing. This dipping-frame is divided into one, two, or more rows and is perforated or made in the shape of a grating. It merely reciprocates vertically, and to that end it is carried by the arms 23, mounted on the transverse bar 24. In order to render the motion of the dipping-frame 22 independent of that of the carrier-frame 5, the arms 23 pass loosely through slots 49 of the lateral flanges 13 of the carrier-frame 5. (See Figs. 2 and 3.) The crossbar 24 is guided in vertical slots 25 of the frame 26. The free ends of the bar 24 carry the arms 27, projecting downward and arranged outside the frame 26, which are guided vertically in projections 28 of the frame 26.

The lower ends of the arms of the dipping-frame 27 are mounted with rollers 29 and are raised by cams 30 of the spindle 31, so that the dipping-frame 22 is moved up and down by its own weight at equal intervals, whereby the articles on the frame are dipped with their lower surface into the icing contained in the reservoir 21.

The right frame-wall 32 of the transport-frame 5 is flush with the left frame-wall 33 of the first row of compartments on the dipping-frame 22, so that during the advance of the transport-frame 5 the dipped articles are pushed off onto a grate-shaped depositing device (depositor) 35, which can be turned through an angle of about one hundred and eighty degrees by means of a spindle 34. After the articles have been pushed on the depositor the depositor 35 is operated and lies during this act in same plane with the completely-raised dipping-frame 22. (See Fig. 4.) The depositor places the articles with their iced surface upward onto another transport-band 36 and conveys the same to any desired place. The movement of the depositor 35 is effected at the proper time by one of the arms 27. To that end one arm 27 is provided with two projections 37 and 38, an arm 39 of a toothed segment 41, rotatably supported on the frame at 40, engaging between said projections. This toothed segment 41 engages with a pinion 42, mounted on one end of the depositor-spindle 34. During the upward and downward stroke of the arm 27 the projections 37 and 38 alternately press the arm 39 of the toothed segment 41, and in this way the depositor 35 is alternately placed opposite the dipping-frame 22 or opposite the transport-band 36. An arm 50, mounted on the spindle 34, secures the end positions of the turning device.

In the construction illustrated the dipping-frame 22 has two rows of compartments. The articles are therefore dipped twice. If it is desired to dip the work more than twice, it is necessary to provide the dipping-frame 22 with more rows of compartments.

In the construction described it can happen, owing to the different shapes of the articles, that they do not fall properly from the transport-band 1 over the oblique chute 2 into the transport-frame 5. To avoid this, the apparatus can be constructed as shown in Figs. 9, 10, and 11. The oblique chute 2 and the spring-fingers 19 are done away with and the upper carrying portion of the transport-band 1 is placed in the same horizontal plane as the transport-table 4. In this construction the falling of the articles is avoided and the articles are moved from the transport-band 1 directly to the table 4 by means of the transport-frame 5. The wall 18 of the transport-frame 5 may have teeth 43 on the lower side, which will pass in between teeth of the transport-band, securing a positive grip of the articles without damaging them.

Having now particularly described and ascertained the nature of my invention and in what manner the same is to be performed, I declare that what I claim is—

1. A coating-machine for the purpose set forth, embodying a support upon which the articles to be coated are to be conveyed, a vertically-movable conveying-frame reciprocating in one direction on said support and in the opposite direction over and above said support, a vertically-movable dipping-frame arranged in operative relation with respect to the said support and with the coating material and adapted to receive the articles to be coated from said support, and means for receiving the coated articles from said dipping-frame.

2. A machine for the purpose set forth, embodying a support upon which the articles to be coated are conveyed, a vertically-movable dipping-frame arranged in operative relation with respect to said support and with the coating material and adapted to receive the articles to be coated from said support, a vertically-movable conveying-frame reciprocating in one direction on said support and dipping-frame and in the opposite direction over and above said support and dipping-frame, and means for receiving the coated articles from said dipping-frame.

3. A coating-machine for the purpose set forth, embodying a support upon which the articles to be coated are conveyed, means for feeding the articles to said support, a vertically-movable conveying-frame reciprocating in one direction on said support, and in the opposite direction over and above said support, a vertically-movable dipping-frame arranged in operative relation with respect to said support and with the coating material and adapted to receive the articles to be coated from said support, and means for receiving the coated articles from said dipping-frame.

4. A coating-machine for the purpose set forth, embodying the combination with a dipping mechanism, of a reciprocatory means for simultaneously conveying uncoated articles and discharging coated articles to and from said dipping mechanism.

5. A coating-machine for the purpose set forth, comprising the combination with a mechanism for applying a plurality of coatings to articles arranged in rows, of a reciprocatory means for simultaneously conveying uncoated articles in rows and discharging coated articles in rows to and from the said dipping mechanism.

6. A coating-machine for the purpose set forth, comprising the combination with a mechanism for applying a plurality of coatings to the articles of each row of a plurality of rows of articles to be coated, of a reciprocatory means for simultaneously conveying uncoated articles in rows to and for discharging a single row of coated articles from said mechanism.

7. A coating-machine for the purpose set forth, comprising the combination with a dipping mechanism, of a vertically-movable and reciprocatory means for intermittently conveying in rows articles to be coated to said mechanism and for discharging the coated row of articles from said mechanism.

8. A coating-machine for the purpose set forth, comprising the combination with a mechanism for applying a plurality of coatings to articles arranged in rows, of a vertically-movable and reciprocatory means for conveying the articles to be coated in rows to said mechanism and for discharging the coated articles from the said mechanism.

9. A coating-machine for the purpose set forth, comprising the combination with a mechanism for applying a plurality of coatings to the articles of each row of a plurality of rows of articles to be coated, of a vertically-movable and reciprocatory means for conveying the articles to be coated in rows to said mechanism and for discharging a single row of coated articles from said mechanism.

10. A coating-machine for the purpose set forth, comprising the combination with a dipping mechanism, of a reciprocatory means for simultaneously and intermittently conveying rows of uncoated articles to and for discharging a coated row of articles from said mechanism, means for receiving the coated articles from the dipping mechanism and for transferring the articles to a conveying mechanism, and the conveying mechanism.

11. A coating-machine for the purpose set forth, comprising the combination with a mechanism for applying a plurality of coatings to articles arranged in rows, of means for simultaneously conveying uncoated articles in rows to and for discharging coated articles from said mechanism, means for receiving the coated articles from the dipping mechanism and for transferring the articles to a conveying mechanism, and the conveying mechanism.

12. A coating-machine for the purpose set forth, comprising the combination with a mechanism for applying a plurality of coatings to the articles of each row of a plurality of rows of articles to be coated, of means for simultaneously conveying the articles to be coated in rows to said mechanism and for discharging a single row of coated articles from said mechanism, means for receiving the coated articles from the dipping mechanism and for transferring the articles to a conveying mechanism, and the conveying mechanism.

13. A coating-machine for the purpose set forth, comprising the combination with a dipping mechanism, of a vertically-movable and reciprocatory means for intermittently conveying in rows articles to be coated to said mechanism and for discharging the coated row of articles from said mechanism, means for receiving the coated articles from the dipping mechanism and for transferring the articles to a conveying mechanism, and the conveying mechanism.

14. A coating-machine for the purpose set forth, comprising the combination with a mechanism for applying a plurality of coatings to articles arranged in rows, of a vertically-movable and reciprocatory means for conveying the articles to be coated in rows to said mechanism and for discharging the coated articles from the said mechanism, means for receiving the coated articles from the dipping mechanism and for transferring the articles to a conveying mechanism, and the conveying mechanism.

15. A coating-machine for the purpose set forth, comprising the combination with a mechanism for applying a plurality of coatings to the articles of each row of a plurality of rows of articles to be coated, of a vertically-movable and reciprocatory means for conveying the articles to be coated in rows to said mechanism and for discharging a single row of coated articles from said mechanism, means for receiving the coated articles from the dipping mechanism and for transferring the articles to a conveying mechanism, and the conveying mechanism.

16. A coating-machine for the purpose set forth, comprising the combination with a vertically-movable dipping mechanism for coating articles, of a vertically-movable and reciprocatory compartment-frame for intermittently conveying the articles to be coated to said mechanism and for discharging the coated articles from said mechanism.

17. A coating-machine for the purpose set forth, comprising the combination with a vertically-movable dipping mechanism for coating articles, of a vertically-movable and reciprocatory compartment-frame for intermittently conveying the articles to be coated to said mechanism and for discharging the coated articles from said mechanism, means arranged in operative relation with respect to said frame for supporting the articles during the conveying thereof to said mechanism, and means for feeding the articles to said support.

18. A coating-machine for the purpose set forth, comprising the combination with a vertically-movable dipping mechanism for coating articles, of a vertically-movable and reciprocatory compartment-frame for intermittently conveying the articles to be coated to said mechanism and for discharging the coated articles from said mechanism, means arranged in operative relation with respect to said frame for supporting the articles during the conveying thereof to said mechanism, means for feeding the articles to said support, means for receiving the coated articles from said dipping mechanism, and for transferring the coated articles to a conveyer mechanism, and the conveyer mechanism.

19. A coating-machine for the purpose set forth, comprising an automatically-operable conveying mechanism for coating the articles, an automatically-operable transporting means for conveying the articles to be coated to said conveying mechanism and for removing the coated articles from the said dipping mechanism, and an automatically-operable means for receiving and transferring the coated articles.

20. A coating-machine for the purpose set forth, comprising an automatically-operable conveying mechanism for coating articles, an automatically-operable transporting means for conveying the articles to be coated to said dipping mechanism and for removing the coated articles from the said dipping mechanism, an automatically-operable means for receiving and transferring the coated articles, a supporting means for the articles while being conveyed to the dipping mechanism, and means for positioning the articles to be coated upon said support when fed thereto.

21. A machine of the character set forth, embodying a dipping mechanism for coating the articles, a cam mechanism for operating said dipping mechanism, a compartment-frame for conveying articles to be coated in rows to said dipping mechanism, a cam mechanism for operating said frame, means for receiving and transferring the coated articles from said dipping mechanism, and means operated by the cam mechanism for the dipping mechanism for operating said receiving and transferring means.

22. A machine of the character set forth, embodying a dipping mechanism for coating the articles, a cam mechanism for operating said dipping mechanism, a compartment-frame for conveying the articles to be coated in rows to said dipping mechanism, a cam mechanism for operating said frame, means for receiving and transferring the coated articles from said dipping mechanism, means operated by the cam mechanism for the dipping mechanism for operating said receiving and transferring means, a support for the articles as they are conveyed in rows to said dipping mechanism, and means for feeding and positioning the articles in rows upon said support.

23. A coating-machine comprising a support, a series of chutes arranged in operative relation with respect thereto and adapted to position the articles to be coated upon the support in rows, a compartment-frame operating on and over said support and adapted to intermittently convey the rows of articles to be coated, a vertically-movable dipping mechanism arranged in operative relation with respect to said support and adapted to receive the articles to be coated from said support, said frame adapted to discharge the coated articles from said dipping mechanism, a receiving and transferring means for the coated articles, and a conveying means arranged in operative relation with respect to said receiving and transferring means.

24. A coating-machine comprising a support, a series of chutes arranged in operative relation with respect thereto and adapted to position the articles to be coated upon the support in rows, a compartment-frame operating on and over said support and adapted to intermittently convey the rows of articles to be coated, a vertically-movable dipping mechanism arranged in operative relation with respect to said support and adapted to receive the articles to be coated from said support, said frame adapted to discharge the coated articles from said dipping mechanism, a receiving and transferring means for the coated articles, a conveying means arranged in operative relation with respect to said receiving and transferring means, a cam mechanism for operating said frame, a cam mechanism for operating said dipping mechanism, and mechanism operated by the operating mechanism for the dipping mechanism for operating said receiving and transferring means.

In testimony whereof I have hereunto set my hand in presence of two subscribing witnesses.

HERMANN PECHER.

Witnesses:
 FR. HOYERMANN,
 HERM. M. SCHELLING.